United States Patent [19]

Pilkington

[11] 4,378,439

[45] Mar. 29, 1983

[54] PURIFICATION OF SALINE SOLUTIONS

[75] Inventor: Norman H. Pilkington, Glen Waverley, Australia

[73] Assignee: ICI Australia Limited, Victoria, Australia

[21] Appl. No.: 883,666

[22] Filed: Mar. 6, 1978

[51] Int. Cl.$^3$ .............................................. B01J 49/00
[52] U.S. Cl. ..................................... 521/26; 210/670; 210/686
[58] Field of Search ................... 210/24, 30, 32, 37 P, 210/37 B, 38 R, 38 A, 38 B, 38 C, 670, 673, 686; 521/26

[56] References Cited

U.S. PATENT DOCUMENTS

| | | | |
|---|---|---|---|
| 3,342,730 | 9/1967 | Mihara et al. | 210/32 |
| 3,645,922 | 2/1972 | Weiss et al. | 210/24 |
| 3,716,481 | 2/1973 | Battaerd | 210/32 |
| 3,839,237 | 10/1974 | Battaerd et al. | 210/32 |
| 3,957,699 | 5/1976 | Solomon et al. | 526/90 |
| 4,087,357 | 5/1978 | Barrett et al. | 210/32 |

OTHER PUBLICATIONS

Cable et al., "An Australian Desalination Process Becomes Established", *The Chemical Engineer*, No. 324, pp. 624–628, Sep. 1977.

*Primary Examiner*—Ivars C. Cintins
*Attorney, Agent, or Firm*—Cushman, Darby & Cushman

[57] ABSTRACT

A process for the demineralization of a bicarbonate- or bisulphite-bearing saline solution by means of amphoteric thermally regenerable ion-exchange resins and comprising the regeneration of the resins using as a regenerating agent a solution which is more acidic by a chosen amount than is the saline solution.

17 Claims, No Drawings

PURIFICATION OF SALINE SOLUTIONS

This invention relates to processes whereby aqueous saline solutions may be demineralized, and, more particularly, the invention relates to such processes comprising the use of ion-exchange technology for the treatment of aqueous saline solutions which contain at least one type of ion selected from bicarbonate, bisulphite and species related thereto as part of the saline component of the solution.

It is known that saline solutions may be demineralized at least in part by treating them by a process involving the use of resinous material capable of acting as ion-exchange material, and from amongst the range of ion-exchange materials suitable for this purpose mention is made of ion-exchange materials comprising as a first active component acidic polymeric material, and as a second active component basic polymeric material.

The acidic and basic polymeric materials may be contained in separate vessels or they may be in the form of a mixed bed of free-flowing particles.

From amongst the classes of acidic polymeric materials and basic polymeric materials suitable for use as components of ion-exchange materials there are particular subclasses which are especially useful for effecting at least partial demineralization of saline solutions. These subclasses comprise weakly acidic polymeric materials and weakly basic polymeric materials and derivatives thereof, and they have been used for this purpose for many years for treating saline solutions by a variety of methods. When used on a commercial basis it is usually necessary that the ion-exchange materials be responsive to treatments whereby they may be regenerated after a period of use and thereby be rendered suitable for reuse as an ion-exchange material, especially in processes wherein a stream of saline solution is being treated in a continuous or semicontinuous manner. When such weakly acidic and weakly basic polymeric materials are used as components of ion-exchange materials the demineralization procedure is usually performed on a cyclic basis comprising firstly, the removal of at least a part of the saline component of a saline solution from the solution by adsorbing the saline material onto the polymeric material thereby providing a desalinated solution, often referred to as product water, and a salt-laden polymeric material; and secondly treating the salt-laden polymeric material in a manner so that the adsorbed saline material is separated from the salt-laden polymeric material to provide a regenerated ion-exchange material suitable for further use as material capable of removing at least a part of the saline component of a saline solution from the solution. A range of procedures for obtaining regenerated ion-exchange material from salt-laden ion-exchange material has been proposed over many years. For example in J. Appl. Chem., 352, 19 (December 1969) it has been suggested in qualitative terms that a mixed bed composed of weak-electrolyte ion-exchangers can be regenerated in situ with $CO_2$-saturated water. It has also been proposed in Chemistry and Industry, 744 (Sept. 4, 1976) that mixed bed ion-exchangers comprising weak electrolyte resins capable of deionizing sodium bicarbonate or ammonium bicarbonate solutions could, at least feasibly if not as yet practically, be regenerated by the indirect utilization of heat. Still further it has been proposed in the specification of U.S. Pat. No. 4,039,442 to Kadlec that in a multiple bed ion-exchange system comprising a weak cation exchanger and a strong anion exchanger the components of the system may be regenerated by means comprising the use of deionized water having a temperature greater than 30° C.

Yet again the aforementioned weakly acidic and weakly basic polymeric materials may be used in a composite form as ion-exchange material for the purposes of demineralizing a saline solution in a process comprising a procedure whereby the ion-exchange material may be regenerated by heat derived from a hot saline solution. Such ion-exchange materials of this last type are frequently referred to as "Sirotherm" ion-exchange materials or "Sirotherm" resins ("Sirotherm" is a registered Trade Mark of ICI Australia Limited) and references to such material and processes in which they may be used are available in publications such as Australian Patent Specifications No. 274 029 and 434 130;

"An Ion Exchange Process with Thermal Regeneration"
| Part I | J. Inst. Engr. Aust | (1965) 37, 193 |
|---|---|---|
| Part II | Aust. J. Chem. | (1966) 19, 561 |
| Part III | " | (1966) 19, 589 |
| Part IV | " | (1966) 19, 765 |
| Part V | " | (1966) 19, 791 |
| Part VI | " | (1968) 21, 2703 |
| Part VII | Desalination | (1970) 8, 21 |
| Part VIII | " | (1973) 12, 217 |
| Part IX | " | (1973) 13, 269; |
| or | | |
| "Desalination by Thermally Regenerable Ion Exchange" | | |
| Proc. Roy. Aust. Chem. Inst. | | (1976) 43, 345. |

These so-called "Sirotherm" ion-exchange materials may be prepared in a multiplicity of forms, and from such forms typical examples include microbead particles of size in a range from about 0.1 to about 10 microns containing both weakly basic polymeric material and weakly acidic polymeric material located in an inert matrix such as polyvinyl alcohol. Alternatively in another form sometimes referred to as an active-matrix form, these "Sirotherm" resins may be microbead particles of a weak acid cation or a weak base anion exchange resin encapsulated in a matrix of a weak base anion or weak acid cation exchange resin opposite in type to the microbead resin.

Particularly useful basic polymeric components for thermally regenerable ion-exchange resins are polyamines of both the aromatic and aliphatic types. As a typical example of the poly(aromatic amine) reference is made to polymers derived from an amine derivative of styrene. In respect to poly(aliphatic amines) it is preferred that they be derived from unsaturated monomers, and more preferred that such monomers be of the allylamine type such as triallylamine, diallylamine or derivatives thereof. Such basic resins of the poly(allylamine) class are described for example in U.S. Pat. Nos. 3,619,394, 3,716,481 or 3,957,699. Typical monomers from which such resins may be derived include for example triallylamine, diallylamine or substituted diallylamines such as alkyldiallylamines, aralkyldiallylamines, bis(N,N-diallylamino)alkanes or N,N,N',N'-tetrallylalkanediamines. Typical monomeric representatives of the above class include
methyldiallylamine,
ethyldiallylamine,
n-Propyldiallylamine,
isopropyldiallylamine,
n-butyldiallylamine,
benzyldiallylamine, 1,6-bis(N,N-diallylamino)hexane,
1,4-bis(N,N-diallylaminomethyl)benzene,
1,2,4-tris(N,N-diallylaminomethyl)benzene,
1,3,5-tris(N,N-diallylaminomethyl)benzene,
2,4,6-tris(N,N-diallylaminomethyl)toluene,
N-(4-N,N-dimethylaminomethylbenzyl)diallylamine,
N-(4-N,N-dipropylaminomethylbenzyl)diallylamine,
N-(4-N,N-diisopropylaminomethylbenzyl)diallylamine,
N-(4-N,N-diallylaminomethylbenzyl)diallylamine, or
N-(4-N,N-dimethylbenzyl)diallylamine.

Where desired the polymeric materials derived from such basic monomers may be crosslinked in part prior to being used as a component of an ion-exchange resin and conveniently the degree of crosslinking may be in a range from 3 to 25% and frequently in a range from 5 to 10%, on a molar basis with respect to the polymer; the crosslinking moiety being, for example, aromatic such as p-xylylene or aliphatic such as hexamethylene.

As well as the kind of basic homopolymers described above the basic polymeric component of the ion-exchange resin may be a basic copolymeric material. Typical such copolymers include those described for example in U.S. Pat. No. 3,957,699 such as copolymers derived from bis(N,N-diallylamino)1,6-hexane and a range of alkyl substituted diallylamines.

Suitable basic polymeric components for thermally regenerable ion-exchange resins include polymers obtained by the polymerization of salts of bis(diallylamino)alkanes. Thus typical polymers of this type include
poly[(allyl)$_2$N-(CH$_2$)$_3$-N(allyl)$_2$] and
poly[(allyl)$_2$N-(CH$_2$)$_{10}$-N(allyl)$_2$].

Acidic polymeric components for thermally regenerable ion-exchange materials may be formed by the polymerisation of an ethylenically unsaturated carboxylic acid. Examples of useful ethylenically unsaturated carboxylic acid monomers include acrylic acid, methacrylic acid, maleic acid, itaconic acid, crotonic acid, or vinyl benzoic acid. Alternatively, derivatives of such monomers such as an ester, anhydride or nitrile which can be converted into the desired weak acid functionality by hydrolysis can be used. Typical examples of such derivatives include methylacrylate, maleic anhydride or acrylonitrile. It is often desirable to crosslink such acidic polymeric components and under these circumstances it is convenient to have from 0.5 to 10% w/w of a polyvinyl crosslinker present with the acidic monomer during the polymerization step. Suitable polyvinyl crosslinking agents include divinylbenzene, divinylpyridine, divinyltoluene, divinylnaphthalene, diallylphthalate, ethylene glycol diacrylate, ethylene glycol dimethylacrylate, diallyl succinate or N,N'-methylenediacrylamide. Particularly suitable acidic polymeric components are those prepared by polymerization of acrylic or methacrylic acid optionally crosslinked by the use of divinylbenzene.

Many saline solutions have little or no effect on the ability of the amphoteric ion-exchange resins described hereinbefore to be regenerated by known methods such as those referred to previously in this specification. However it has been observed that the presence of certain ions, such as for example bicarbonate ions or sulphur-containing ions of the reducing type such as bisulphite or sulphite, in the saline solutions being treated, tends to mitigate against the regeneration of amphoteric ion-exchange materials by thermal means. Attempts have been made for many years to improve the performance of such amphoteric resins; thus for example it is taught in the specification of Australian Patent No. 295 961 that it is desirable to control the pH value of the feedwater prior to treating such feedwater with an amphoteric heat regenerable ion-exchange resin to avoid undesirable deterioration of the capacity of the resin to act as an ion-exchange material. It has been proposed also that prior to using thermally regenerable amphoteric ion-exchange resins to demineralize saline solutions containing bicarbonate ions, such ions should be removed in a separate step, by for example, acid dosing followed by degassing, or by a treatment with an acidic ion exchange resin followed by degassing. Thus it will be apparent that the teaching of the prior art, in respect of prolonging the activity of amphoteric ion-exchange materials used to demineralize saline solutions containing undesirable ions, has been directed to treatment of these saline solutions to remove the undesirable ions, such as for example bicarbonate or bisulphite, prior to subjecting the saline solution to a demineralization step. There is no teaching in the prior art that the pretreatment of undesirable ion-bearing saline solutions is unnecessary if the capacity of amphoteric ion-exchange materials is to be prolonged. In some circumstances it is not convenient to treat saline solutions to remove undesired ions prior to subjecting such solutions to demineralization by ion-exchange technology. Such treatment also adds to the costs of the demineralization process, since considerable amounts of treatment reagents, such as mineral acids, are usually required to remove the ions. In contradistinction to the prior art which has taught that saline feed solutions should be treated by removing undesired ions therein, we have found that the capability of amphoteric regenerable ion-exchange material to be regenerated can be enhanced if such salt-laden ion-exchange material is regenerated with a regenerating solution which is slightly more acidic, of the order of about 2 units of pH, than the saline solution which comprises undesired ions and which is being demineralized. The precise pH value used for a particular regenerating system is best chosen after making a few simple experiments involving the ion-exchange material and the saline solution which is being demineralized so as to determine the conditions most suitable for the regeneration of the ion-exchange material.

Accordingly in one aspect of the invention there is provided in a process wherein a salt-laden composition, comprising as a first component an amphoteric ion-exchange material which has been used to demineralize a saline solution, and as a second component saline material derived from said saline solution, is treated with a regenerating solution in a manner such that the ion-exchange capacity of the said first component is restored at least in part, the improvement wherein the said second component is separated from the said first component by contacting the said composition with a regenerating solution in which at least part of the said second component is soluble, said regenerating solution being characterized in that it is more acidic than is the said saline solution, and that the pH value of the said regenerating solution is adjusted to a chosen value such that the difference between the pH value of the said saline solution and the pH value of the said regenerating solution is up to 2 units of pH, and usually is in a range from 0.5 to 1.5 units of pH.

The regenerating solution is conveniently an aqueous medium and the pH thereof may be adjusted by conventional means to a chosen value in respect of the pH of the saline solution being demineralized. Thus for example the pH may be adjusted using an amount of a mineral acid such as hydrochloric acid or sulphuric acid, or by using a gas such as carbon dioxide. The aqueous medium may be for example water or an aqueous solution of salts. It is often convenient to use an aqueous medium obtained as a product or a by-product from a demineralization process as a component of the regenerating solution.

The process of the invention is useful when the ion-exchange material is a thermally regenerable material. It is of particular utility when applied to processes wherein the ion-exchange resins of the so called "Sirotherm" type are used to demineralize aqueous saline solutions containing ions which tend to impair the capability of such resins to be regenerated by means conventionally used with such resins during a cyclic demineralization process. Accordingly in an embodiment of the invention there is provided in a process wherein a first aqueous saline solution having a first pH value and comprising at least one type of ion selected from the group consisting of bicarbonate and bisulphite is demineralized at least in part by the use of thermally regenerable resinous material comprising as a first active component weakly acidic polymeric material and as a second active component weakly basic polymeric material, said process comprising the steps of first passing said first saline solution at a first temperature through a bed of said resinous material in a manner such that at least part of the saline component of the said first solution is transferred from said first solution to said resinous material to form a salt-laden resinous composition and a second aqueous solution, the concentration of the saline component of the said second solution being less than the concentration of the saline component of the said first solution; secondly forming a regenerating solution by heating an aqueous medium, preferably one of said first or second solutions, to a second temperature greater than said first temperature; thirdly passing the hot regenerating solution so obtained through said salt-laden resinous composition so as to transfer at least part of the saline component of the said salt-laden resinous composition from the said salt-laden resinous composition to the said regenerating solution, the improvement wherein prior to forming the said regenerating solution, the pH value of the aqueous medium from which it is derived is adjusted to a chosen second pH value such that the said second pH value is less than is the first pH value, and that the difference between the said second pH value and the said first pH value is up to 2 units of pH, and is usually in a range from 0.5 to 1.5 units of pH.

The thermal regenerable resinous materials used in the process of the invention may comprise acidic and basic polymeric components as hereinbefore described. The choice of the type of components and the percentage of the ion exchange resin which they constitute will depend to some extent on the nature of the saline solution to be treated and the chemical characteristics thereof such as alkalinity, acidity, hardness and the like. Typical examples of suitable ion-exchange resins include resins wherein the basic and acidic polymeric components are as set out below in Table 1.

TABLE 1

| Resin Type No. | Basic polymeric component | Acidic polymeric component |
|---|---|---|
| 1 | Poly(triallylamine) | Poly(methacylic acid) |

TABLE 1-continued

| Resin Type No. | Basic polymeric component | Acidic polymeric component |
|---|---|---|
| 2 | Poly(triallylamine) | Poly(acrylic acid) |
| 3 | Poly(propyldiallylamine) | Poly(methacrylic acid) |
| 4 | Poly(propyldiallylamine) | Poly(acrylic acid) |
| 5 | Poly(styrenic amine) | Poly(methacrylic acid) |
| 6 | Poly(styrenic amine) | Poly(acrylic acid) |

Other resins which may be usefully regenerated are those disclosed in the specification of U.S. Pat. No. 3,957,698 to Hatch and of these typical examples include ion-exchange resins wherein a microbead resin of polyacrylic acid or polymethacrylic acid crosslinked with about 0.5 to 10% w/w divinylbenzene is incorporated in a matrix resin of an aminated styrene-divinylbenzene resin.

The process of the invention has provided a technical advance in the technology relating to the demineralization of saline solutions by means of ion-exchange resins in so far as it has facilitated the restoration and maintenance of the capacity of such resins to act as demineralizing agents. The processes of the invention may be applied to intermittent cyclic fixed-bed demineralization procedures and such processes are particularly useful when the procedures are performed using a moving-bed on a semi-continuous or continuous basis.

The invention is now illustrated by, but is not limited to, the following examples in which all parts and percentages are on a weight basis unless otherwise specified. Examples 2 and 7 do not lie within the invention and are included for the purpose of comparison.

EXAMPLE 1

In this example an alkaline saline water containing sodium bicarbonate was treated with an ion-exchange resin and the ion-exchange resin was regenerated after being used. Into a cylindrical ion-exchange column of diameter 5 centimeters and length 76 centimeters there was placed an amount of an ion-exchange resin such that it occupied 1000 milliliters of the volume of the column. The ion-exchange resin was of a thermally regenerable type and comprised particles containing one part of poly(triallylamine) and one part of poly(acrylic acid) dispersed in two parts of a matrix of commercially available poly(vinyl alcohol). A first saline feed solution was prepared by dissolving amounts of sodium chloride and sodium bicarbonate in water so as to provide in a liter of the feed solution a concentration of 20 milliequivalents of sodium chloride and 5 milliequivalents of sodium bicarbonate. To the stirred feed solution so prepared there was added hydrochloric acid sufficient to adjust the pH of the feed solution to a value of 7.5. The ion-exchange column was placed in a position such that its major dimension was in vertical plane. The temperature of the feed solution referred to above was adjusted to a value of 20° C. and fed in a downflow manner through the ion-exchange resin in the ion-exchange column at a rate of 300 milliliters per minute for a period of 50 minutes to provide a partially demineralized aqueous stream, hereinafter referred to as product water, and a salt-laden ion-exchange resin. A second solution was prepared by first, dissolving amounts of sodium chloride and sodium bicarbonate in water so as to provide in a liter of the second solution a concentration of 20 milliequivalents of sodium chloride and 5 milliequivalents of sodium carbonate, secondly adding hydrochloric acid sufficient to adjust the pH of the second solution to a value of 7.5, and thirdly passing through the pH-adjusted second solution a gaseous mixture containing 10% v/v of carbon dioxide and 90% v/v of nitrogen so that the pH of the solution was adjusted further to a value of 6.4. There was thus obtained from the second solution, a regenerating solution. The regenerating solution so obtained was heated to a temperature of 85° C. and pumped in a downflow manner through the salt-laden ion-exchange resin in the ion-exchange column at a rate of 300 milliliters per minute for a period of 16 minutes to provide a regeneration effluent containing saline material derived from the ion-exchange resin. For the purposes of this document the above procedure in general terms, whereby there is obtained sequentially a partially demineralized product water and a regeneration effluent, will be referred to hereinafter as "a cycle".

The above procedure was repeated for a further four cycles and the effluent material was examined to determine the ion-exchange capacity of the regenerated ion-exchange resin, and this capacity was found to be 0.20 milliequivalent per milliliter of ion-exchange resin per cycle. Similar examinations were made after the performance of 59, 110 and 153 cycles and in each of these instances the capacity was also 0.20 milliequivalent per milliliter of ion-exchange resin per cycle.

EXAMPLE 2

In this comparative Example the general procedure of Example 1 was repeated except that the regenerating solution of that example was replaced by a solution identical with the saline feed solution of Example 1. The ion-exchange capacity of the regenerated ion-exchange resin after three cycles was 0.20 milliequivalent per milliliter of ion-exchange resin per cycle, and after 23 and 44 cycles the corresponding capacity values were 0.085 and 0.02 respectively.

EXAMPLE 3

The general procedure of Example 1 was repeated except that the composition of the gaseous mixture used in the preparation of the regenerating solution was changed to a mixture in which the volume ratio of carbon dioxide to nitrogen was 1:4. The pH of the regenerating solution so prepared was 5.9. After 120 cycles the ion-exchange capacity of the regenerated ion-exchange resin was 0.18 milliequivalent per milliliter of ion-exchange resin per cycle.

EXAMPLE 4

The general procedure of Example 1 was repeated except that (a) the feed solution was fed in an upflow manner through the ion-exchange resin; (b) the gaseous mixture used to prepare the regenerating solution was omitted and addition of hydrochloric acid to the second solution was continued until the pH of that solution was adjusted to a value of 6.2; and (c) the temperature of the regenerating solution pumped through the salt-laden ion-exchange resin was in a range from 92° to 94° C. After 5 cycles the ion-exchange capacity of the regenerated ion-exchange resin had a value of 0.21 milliequivalent per milliliter of ion-exchange resin per cycle and this value lay in a range from 0.19 to 0.23 when estimated at intervals over the next 150 cycles. The usage of hydrochloric acid in the control loop for the preparation of the regenerating solution was 11% of the stoichiometric amount which would have been required if a dealkalization resin had been used to remove the bicarbonate component from the feed solution in a separate treatment step prior to subjecting the feed solution to a treatment with ion-exchange resin material.

EXAMPLE 5

This example illustrates a process of the invention wherein the ion-exchange resin is eminently suitable for use with saline solutions which are acidic. In this example the general procedure of Example 4 is repeated except that (a) the ion-exchange resin of that Example is replaced by an ion-exchange resin of a thermally regenerable type comprising particles containing 28 parts of poly(styrenic amine) and 22 parts of poly(acrylic acid) dispersed in a matrix of 50 parts of polyvinyl alcohol; (b) the pH of the feed solution is adjusted to a value of 5.5; and (c) the pH of the regenerating solution is adjusted to a value of 4.6. After 50 cycles the value of ion-exchange capacity of the regenerated ion-exchange is essentially unchanged in comparison with that value after 5 cycles.

EXAMPLE 6

This example illustrates a process of the invention wherein a saline solution containing sulphur-bearing material capable of acting as a reducing agent may be treated to demineralize it in part using a thermally regenerable ion-exchange resin.

Into a cylindrical ion-exchange column having a diameter of 1.6 centimeters and a length of 65 centimeters there is placed an amount of particulate ion-exchange resin such that it occupies 120 milliliters of the volume of the column. The ion-exchange resin used is an amphoteric thermally regenerable type and comprises particles containing 29 parts of poly(propyldiallylamine) and 27 parts of poly(acrylic acid) dispersed in a matrix of poly(vinyl alcohol). A first solution suitable for use as a component of a saline feed and containing sodium bisulphite is prepared by first, dissolving amounts of sodium chloride and sodium sulphite in water to provide concentrations of 500 milligrams of sodium chloride per liter of solution and 60 milligrams of sodium sulphite per liter of solution and secondly adding hydrochloric acid to the solution in an amount sufficient to adjust the pH of the mixture to a value of 7.2. The saline feed so prepared is stored in a vessel under an atmosphere of nitrogen and fed in an upflowing manner at a temperature of 20° C. at a rate of 40 milliliters per minute for a period of 82 minutes through the ion-exchange resin in the ion-exchange column to provide partially demineralized product water and a salt-laden ion-exchange resin. A regenerating solution is prepared in a manner similar to that used to prepare the saline feed except the amount of hydrochloric acid used is changed so as to adjust the pH of the mixture to a value of 6.0. The regenerating solution so obtained is heated to a temperature of 91° C. in a vessel provided with an atmosphere of nitrogen and is then pumped in a downflowing manner through the salt-laden ion-exchange resin in the ion-exchange column at a rate of 40 milliliters per minute for a period of 22 minutes to provide a regeneration effluent containing saline material derived from the ion-exchange resin. The ion-exchange capacity value of the ion-exchange resin so regenerated is 0.19 milliequivalent per milliliter of ion-exchange resin per cycle, and during such a process comprising 50 repetitive cycles this value is substantially constant.

EXAMPLE 7

In this comparative Example the general procedure of Example 6 is repeated except that the regenerating solution of that example is replaced by a solution which is identical with the saline feed. The ion-exchange capacity value of the ion-exchange resin so generated is reduced considerably as the number of cycles is increased and after 50 cycles this value is 0.15 milliequivalent per milliliter of resin.

EXAMPLE 8

In this example the general procedure of Example 1 is repeated except that the ion-exchange resin of that example is replaced by an active-matrix resin prepared as follows. A mixture of 1000 parts of a poly(ethylacrylate) gel containing 68% of solids and crosslinked with 2.5% of divinylbenzene, 1580 parts of diallylamine and 300 parts of 1,6-bis(N,N-diallylamino) hexane dihydrochloride is prepared and allowed to stand at ambient temperature for 60 minutes. It is then homogenized, 100 parts of azobisisobutyramidinium dihydrochloride and 400 parts of water are added and the resultant composition is homogenized further and degassed to form a slurry. The slurry is added with stirring to a mixture of 4000 parts of paraffin oil, 5 parts of dioctadecylamine, and 5 parts of a long chain fatty amine available commercially under the registered trade name of "Kemamine" and the dispersion so formed is heated at a temperature of 65° C. for a period of 20 hours during which time particulate material is formed in the dispersion. This particulate material is separated from the dispersion, washed with hexane, 2 N hydrochloric acid and hydrochloric acid at pH 3, and is then dried to provide resinous material. 100 parts of this resinous material is refluxed for 40 hours under an atmosphere of nitrogen with 3000 parts by volume of a saturated solution of alcoholic potassium hydroxide to provide an ion-exchange resin having a thermal regenerable capacity of 0.8 milliequivalents per gram of resin which is not substantially reduced after 100 cycles.

I claim:

1. A process of regenerating a thermally regenerable amphoteric ion exchange material which has been used to demineralize at a first temperature a saline solution by absorbing ionic species from said saline solution, which solution comprises at least one type of ion selected from the group consisting of bicarbonate and bisulphite, wherein said ion exchange material is treated with an aqueous regenerating solution at a second temperature which is greater than said first temperature so that at least a portion of the ionic species absorbed on said material is transferred to said aqueous regenerating solution, characterized in that said aqueous regenerating solution has a pH value which is less than the first pH value of said saline solution by no more than 2.0 units.

2. A process according to claim 1 wherein said aqueous regenerating solution has a pH value which is between 0.5 and 1.5 units inclusive less than that of said saline solution.

3. A process according to claim 1 wherein said thermally regenerable amphoteric ion exchange material comprises as a first active component weakly acidic polymeric material and as a second active component weakly basic polymeric material.

4. A process according to claim 3 wherein the said weakly acidic polymeric material is derived from the group consisting of an ethylenically unsaturated carboxylic acid and derivatives thereof capable of conversion into a weakly acidic functionality by hydrolysis.

5. A process according to claim 4 wherein the said acid is selected from the group consisting of acrylic acid and methacrylic acid.

6. A process according to claim 3 wherein the said acidic polymeric material is crosslinked at least in part.

7. A process according to claim 3 wherein the said weakly basic polymeric material is derived from the group consisting of aromatic amines and aliphatic amines.

8. A process according to claim 7 wherein the said aromatic amine is an amine derivative of styrene.

9. A process according to claim 7 wherein the said aliphatic amine is an unsaturated amine.

10. A process according to claim 9 wherein the said amine is selected from the group consisting of triallylamine, diallylamine and substituted diallylamines.

11. A process according to claim 10 wherein the said amine is selected from the group consisting of alkyldiallylamines and aralkyldiallylamines.

12. A process according to claim 11 wherein the said alkyldiallylamine comprises an alkyl group containing up to four carbon atoms.

13. A process according to claim 12 wherein the said alkyldiallylamine is propyldiallylamine.

14. A process according to claim 7 wherein the said polymeric material is a copolymer.

15. A process according to claim 3 wherein the said basic polymeric material is crosslinked at least in part.

16. A process according to claim 1 wherein said aqueous regenerating solution is derived from said saline solution by adjusting the pH value of said saline solution to a value which is no more than 2.0 units less than its original value.

17. A process according to claim 16 wherein the pH value of said saline solution is adjusted by treating said saline solution with an acidic substance selected from the group consisting of a mineral acid and an acidic gas.

* * * * *